United States Patent Office 3,341,480
Patented Sept. 12, 1967

3,341,480
CELLULAR POLYOLEFIN
George B. Feild, New Castle, Del., assignor to Hercules Incorporated, a corporation of Delaware
No Drawing. Filed July 2, 1964, Ser. No. 380,018
1 Claim. (Cl. 260—2.5)

This invention relates to a new cellular polyolefin having unique properties and more particularly to a partially crystalline ethylene-propylene copolymer foam.

It is well known that foams can be produced from polyolefins as for example polyethylene, polystyrene, etc. Thus both high and low density polyethylenes have been converted to cellular structures. Such foams have been produced by incorporating in the polymer a solid or liquid blowing agent, which under the influence of heat, evolves gas whereby cells are formed and a low density product is produced. Another process used is the incorporation of a gas in the molten polymer while under pressure followed by release of the pressure whereby the polymer is expanded. Cross-linked polyethylene foams have been prepared by heating a mixture of polyethylene, blowing agent and peroxide cross-linking agent in a first stage to cross-link the polymer and then heating in a second stage to decompose the blowing agent and expand the cross-linked polyethylene. Foams have also been prepared and then cross-linked by way of irradiation in order to improve the foam structure, but, as is well known in the art, such irradiation exerts its maximum cross-linking effects on the surface, decreasing in cross-linking density with depth, thus resulting in a nonuniformly cross-linked foam. More recently these various foaming techniques have been applied to polypropylene and to ethylene-propylene copolymer elastomers. However, foams produced from high density polyethylene, polystyrene or polypropylene are rigid foams and lack the resiliency desired for many uses. Attempts have been made to overcome this deficiency by foaming blends of such polymers with elastomeric polymers, but the procedures are difficult, costly, and the product is frequently non-uniform in structure and has poor tear and abrasion resistance. Low density polyethylene foams are more flexible but lack the resilience required for many applications.

Foams of elastomeric ethylene-propylene copolymers are flexible, resilient, etc., and very similar in their properties to foamed rubber. Because they are elastomeric, these foams on stretching will return to their original shape as soon as the stretching force is removed.

Now in accordance with this invention, it has been discovered that foams prepared from ethylene-propylene copolymers that are at least partially crystalline, have outstanding properties. These foams are flexible, resilient, strong, tough, abrasion resistant, show no signs of tackiness or tendency to adhere to themselves or other surfaces, and exhibit the unique property of being extensible, a substantial portion of which extension is permanently retained when the stretching force is removed. Even more surprising is the fact that on heating the stretched foam to a temperature under the softening temperature, as for example to about 90–100° C., the foam returns to its original shape without destruction of the cell structure. Hence such foams can be used in many applications where the prior art polyolefin foams cannot be used. They are particularly useful in foam wrap applications, such as in electrical insulation, where the wrap must conform to the shape of the article and fit tightly. In such applications, the article can be wrapped with the stretched foam and the foam then heat-shrunk in place. Because these foams take a permanent set, not only on stretching, but also on compression, such foams when so permanently set, are resilient and return completely to this set condition if deformed therefrom. For this reason they are outstandingly useful as gasket material. Having the properties of flexibility, resilience, etc., combined with high strength, resistance to tear and excellent abrasion resistance, the foams of this invention are useful for a wide variety of foam applications such as for carpet backing, rug pads, protective padding, shoe inner soles, seat cushioning, gaskets, electrical insulation, etc.

The copolymers used in the preparation of the foams of this invention can be defined as any copolymer of ethylene and propylene containing at least about 80 mole percent of ethylene and from about 5 to about 20 mole percent of propylene and preferably from about 7 to about 17 mole percent and which copolymer exhibits at least partial crystallinity by X-ray diffraction analysis. In addition to ethylene and propylene, the copolymer can contain other monomers, since such terpolymers are at least partially crystalline if the ethylene content is greater than about 80 mole percent. Suitable termonomers that can be incorporated are aliphatic and alicyclic polyenes such as butadiene, isoprene, 1,4-hexadiene, 6-methyl-1,5-heptadiene, norbornene, 5-methyl-2-norbornene, dicyclopentadiene, etc. When such dienes are incorporated in the copolymer, the amount will generally be within the range of 1 to 6 mole percent and preferably 2 to 5 mole percent. Hence the copolymers used for the preparation of the foams of this invention will contain from about 80 to about 95 mole percent of ethylene, from about 5 to about 20 mole percent of propylene, and from about 0 to about 6 mole percent of a diene.

The copolymer foams of this invention are prepared by heating a mixture of the copolymer, a blowing agent and an azido cross-linking agent, to a temperature above the softening point of the composition and sufficient to release the gas from the blowing agent and to effect azido modification of the polymer by the cross-linking agent. This can be done by any desired means as for example in a single step by heating the mixture in a mold under pressure and then suddenly releasing the pressure, whereby foams with extremely fine cells which are uniform and predominately of closed structure are formed. The mixture can also be heated in an extruder, expansion of the compositon taking place as it leaves the extruder. The temperature at which the mixture is heated will obviously depend on the softening temperature of the composition, the temperature at which the blowing agent releases gas, the temperature at which the cross-linking agent reacts with the polymer, and the type of foaming operation utilized.

Any of the well-known chemical blowing agents can be used in the preparation of the foamed articles in accordance with this invention as, for example, azobis(formamide), diazominobenzene, N,N'-dinitrosopentamethylene tetramine, N,N'-dimethyl-N,N'-dinitrosoterephthalamide, p,p'-oxy-bis(benzene sulfonyl semi-carbazide), azobis(isobutyronitrile), p,p'-oxy-bis(benzene sulfonyl hydrazide), p,p'-diphenyl-bis(sulfonyl hydrazide), benzene-sulfonyl hydrazide, m-benzene-bis(sulfonyl hydrazide), etc. Any of the well-known solvent blowing agents may also be used in this invention as, for example, methyl chloride, methylene chloride, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at least one mole of gas per mole of blowing agent at a temperature of about 190° C. or less may be used.

Any azido cross-linking agent can be used in the preparation of the foamed articles in accordance with this invention. Thus, any poly(sulfonazide), i.e., any compound having the general formula

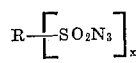

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10 - decane-bis(sulfonazide), 1,11-undecane-bis(sulfonazide), 1,12 - dodecane-bis(sulfonazide), 7 - oxa - tridecane-1,13 - bis(sulfonazide), 6-thiaundecane - 1,11 - bis(sulfonazide); chloroalphatic poly(sulfonazide)s such as the poly(sulfonazide) produced from a chloro- and sulfochlorinated mixture of petroleum hydrocarbons containing at least one chlorine atom and at least two sulfonazide groups per molecule; 1,9,18 - octadecane - tris(sulfonazide), poly(ethylene sulfonazide), poly(sulfonazido-methyl styrene), 1,3- and 1,4-bis(sulfonazido-methyl benzene), 1,3-benzene bis(sulfonazide), 1-octyl-2,4,6-benzene tris( sulfonazide), 4,4'-diphenylmethane bis(sulfonazide), 4,4'-diphenyl ether bis(sulfonazide), 4,4' - bis - octadecyl diphenyl-3,5,3',5'-tetra(sulfonazide), 4,4'-diphenyl disulfide bis(sulfonazide), 1,6-bis(4'-sulfonazidophenyl) hexane, 2,7 - naphthalene bis(sulfonazide), etc. Another class of azido cross-linking agents that can be used are azidoformates which have the general formula

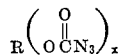

where x is at least 1, preferably from about 1 to about 100, and R is an organic radical, inert to cross-linking reactions, containing at least one carbon atom per azidoformate group. Exemplary of these azidoformates are the alkyl azidoformates such as n-octadecyl azidoformate, tetramethylene-bis(azidoformate), pentamethylene-bis(azidoformate); the cyclic alkyl azidoformates such as 2-(1-p-menthenyl-8-oxy) ethyl azidoformate; the aromatic azidoformates such as phenyl azidoformate, $\alpha,\alpha'$-p-xylylene-bis-(azidoformate), 2,2-isopropylidene-bis(p,p'-phenyl azidoformate); the azidoformate ethers such as 2,2'-oxydiethyl-bis(azidoformate), 2,2'-oxydipropyl-bis(azidoformate), 2,2'-ethylenedioxydiethyl-bis(azidoformate), the tetraazidoformate of pentaerythritol—propylene oxide adduct, the azidoformate thioethers such as 2,2'-thiodiethyl-bis(azidoformate), 4,4'-thiodibutyl-bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected fromt he group of organic radicals consisting of arylene and alkarylene radicals. Exemplary of the aromatic polyazides useful in this invention are m-phenylene diazide, 2,4,6-triazido-benzene, 4,4'-diphenyl diazide, 4,4'-diphenylmethane diazide, 4,4'-diazido dihphenyl amine, 4,4'-diazido diphenylsulfone, 2,7-diazidonaphthalene and 2,6-diazido-anthraquinone. Thus, any compound having at least one azido group in the molecule and preferably two or more can be used as the azido cross-linking agent to prepare the foams in accordance with this invention.

The amount of the azido cross-linking agent utilized will depend upon the type of azido cross-linking agent used, the copolymer being foamed, the properties desired in the final foam, etc. It must be an amount that is sufficient to prevent rupture of the cell walls when the foaming action takes place and at the same time prevent sagging of the hot foamed sheet so that it can be processed, as for example, thermoformed, etc. On the other hand, a large amount of the cross-linking agent can result in too high a degree of cross-linking so that the desired amount of blowing will not occur, and it is not possible to produce low density foams. Generally, it will be an amount of from about 0.01% up to about 1%, and preferably from about 0.1% to about 0.5% by weight of the polymer.

Depending upon the amount and type of azido cross-linking agent used, actual cross-linking of the polymer may or may not occur. Thus, for example, at low levels of polysulfonazides, particularly those of high molecular weight, there will be an insufficient amount to achieve actual cros-linking (insolubilization of the polymer), yet the polymer will be modified to such an extent that collapse of the cell walls is prevented, which collapse would occur if no azido cross-linking agent were used. Larger amounts of the azido cross-linking agent will be used when a cross-linked, foamed product is desired. The amount of blowing agent incorporated will obviously depend upon the degree of blowing desired; that is, the density desired for the final foamed product and the types of blowing agent used.

As pointed out above, the compositon which is heated to produce the cellular ethylene-propylene copolymer is a mixture or blend of the copolymer, azido cross-linking agent and blowing agent. Various methods may be used to effect the heating and foaming of the composition. The polymer, blowing agent and azido cross-linking agent can be blended by any desired means to produce the expandable composition. Thus if a chemical blowing agent is used, the components can be blended on a mill, in an extruder, by means of a diluent, if desired, etc. When solvent types of blowing agents are employed, the copolymer and cross-linking agent can be blended by any desired means and formed into pellets, strips, etc., which can then be soaked in the volatile blowing agent and used. Obviously, many other variations can be made in the method of blending or mixing this three-component compositon. In addition, additives, such as light and heat stabilizers, dyestuffs and pigments, flame retardants, including organic and inorganic flame retardants, such as chlorinated paraffin wax, antimony oxide and other such materials, cell nucleating agents, etc., can be incorporated in the composition that is foamed.

The temperature and length of the heating cycle will depend on the specific copolymer being foamed, the cross-linking agent used, and the blowing agent used. In general, it will be a temperature above the softening point of the composition and sufficient to release the gas from the blowing agent and to effect the azido modification of the copolymer. The softening temperature of the blend will depend upon whether the blowing agent is a solvent type or a chemical type. Thus, with a solvent type blowing agent, the copolymer will at least partially dissolve so that the softening temperature of the blend will be lower than the melting point of the copolymer. On the other hand, with a chemical blowing agent, the softening temperature of the blend will be the melting point of the polymer.

The following examples will illustrate the process of this invention. All parts and percentages are by weight unless otherwise indicated. The molecular weight of the polymers used is indicated by their reduced specific viscosity (RSV), by which term is meant the $\eta$ sp/C determined on a 0.1% solution of the polymer in decahydronaphthalene at 135° C.

*Example 1*

One hundred parts of an ethylene-propylene copolymer, having an RSV of 3.3, containing 16 mole percent of propylene and exhibiting a crystalline-type X-ray diffraction pattern, were blended with 5.0 parts of azobis (formamide) and 0.25 part of 1,10-decane disulfonazide on a two roll mill at 170° C. for about 7 minutes. The material was then sheeted off the mill and cooled.

Forty-eight parts of the above material were placed in a 5 x 5 x 0.15 inch picture frame mold and heated at 227° C. under pressure for 2.25 minutes. The press was then opened allowing the composition to expand in all directions, the expansion being about double the size in all dimensions. The foamed sheet was then cooled and flattened in a cold press. The resulting foam had a density of 5.4 lbs./cu. ft. and was made up of very fine, uniform, closed cells. It had excellent toughness, tear strength and resiliency. It was stretched 250% of its original length and on release of the tension it returned to 160% of its original length. On heating the stretched foam to 100° C., it returned to its original length.

*Example 2*

Example 1 was repeated except that 0.5 part of 1,10-decane disulfonazide was used. A linear expansion of about 1.4 times occurred in all directions and the foam so obtained was a fine-celled foam of closed cells and had a density of 12.5 lbs./cu. ft.

*Example 3*

An ethylene-propylene terpolymer containing 90.4 mole percent ethylene, 6.0 mole percent propylene, and 3.6 mole percent dicyclopentadiene, which on X-ray analysis exhibited crystallinity and had an RSV of 1.9, was foamed by the procedure described in Example 1 except that 0.5 part of 1,10-decane disulfonazide was used. The resulting foam was flexible and tough, with small, uniformly sized, predominately closed cells.

*Example 4*

One hundred parts of an ethylene-propylene copolymer having an RSV of 2.1 and containing 9 mole percent of propylene and shown to have crystallinity by X-ray analysis was compounded on a two-roll mill at 110° C. with 3 parts of azobis(formamide) and 0.5 part of 1,10-decane disulfonazide. The material was removed from the mill as a 3/16 inch sheet.

Eighty-four parts of this composition were placed in a 5 x 5 x 0.25 inch picture frame mold and held in a press at 215° C. for 4.5 minutes. The press was opened rapidly permitting expansion of the foam which, when cooled to room temperature, measured 10 x 10 x 0.48 inches and had a density of 7.5 lbs./cu. ft. The cells of this foam were uniformly fine, predominately closed, and had diameters ranging from 0.005 inch to 0.015 inch.

*Example 5*

A 4 x 4 x 3/16 inch sheet of the milled composition described in Example 4 was placed in a preheated (188° C.) mold 4 x 4 x 2 inches with a closely fitting 4 x 4 x 2 inches piston on top of the sheet. The composition expanded for 3.5 minutes, forcing the piston upward, to a thickness of 1 3/8 inches. At this point the mold was cooled and the foam removed. The foam so obtained had uniform, closed cells, which were 1/32 to 1/16 inch in diameter, and it had a density of 8.8 lbs./cu. ft.

*Example 6*

Fifty parts of a plasticized ethylene-propylene copolymer (having an RSV of 5.3 and containing 18 mole percent of propylene), previously compounded to contain 40% of paraffinic mineral oil, was blended on a two-roll mill at 170° C. with 2.5 parts of azobis(formamide) and 0.5 part of a polysulfonyl azide of tridecane. (The latter compound was prepared by sulfochlorinating tridecane and reacting the chlorosulfonated hydrocarbon with sodium azide. It contained an average of 2 chlorine atoms and 2 sulfonazide groups per molecule.) The composition was then foamed as described in Example 1 with a linear expansion ratio greater than 2. The resultant foam had a density of 5.3 lbs./cu. ft. and the cells were uniformly of closed cell structure.

As can be seen from the foregoing examples the new foams of this invention, prepared from ethylene-propylene copolymers that contain at least 80 mole percent of ethylene and are at least partially crystalline, have many outstanding properties. These foams have very fine cell size of predominately closed cell structure, combined with low density. Thus the foams of this invention have densities of less than about 25 lbs./cu. ft., and preferably from about 2 to about 10 lbs./cu. ft., with cells having diameters less than about 0.2 inch and preferably from about 0.001 inch, or less, to about 0.1 inch, with at least 50% of the cells being closed. These foams, as already pointed out above, have unique properties of resilience, permanent set on the application of tension or compression, etc., which properties make them useful in applications where the prior art polyolefin films could not be used.

What I claim and desire to protect by Letters Patent is:

The process of preparing a cross-linked ethylene-propylene foam having a uniform cell structure in which at least 50% of the cells are closed from an ethylene-propylene copolymer which is predominantly crystalline and contains at least 80 mole percent of ethylene, which comprises (1) blending said ethylene-propylene copolymer with a blowing agent, which yields at least one mole of gas per mole of blowing agent at a temperature above the softening temperature of the composition to about 190° C., and from about 0.01 to about 1%, based on the weight of the copolymer of an azido cross-linking agent selected from the group consisting of poly(sulfonazide)s and poly(azidoformate)s, and (2) heating said blend at a temperature of at least the softening temperature of the blend and sufficient to release gas from said blowing agent whereby blowing and cross-linking of the ethylene-propylene copolymer are effected.

References Cited

UNITED STATES PATENTS

| | | | |
|---|---|---|---|
| 2,387,730 | 10/1945 | Ott | 260—2.5 |
| 2,532,243 | 11/1950 | Alderson | 260—2.5 |
| 3,058,944 | 10/1962 | Breslow et al. | 260—2.5 |
| 3,067,147 | 12/1962 | Rubens et al. | 260—2.5 |
| 3,137,745 | 6/1964 | Johnstone | 260—2.5 |
| 3,250,730 | 5/1966 | Palmer | 260—2.5 |
| 3,250,731 | 5/1966 | Buhl et al. | 260—2.5 |

FOREIGN PATENTS

| | | |
|---|---|---|
| 538,782 | 12/1955 | Belgium. |
| 856,735 | 12/1960 | Great Britain. |

MURRAY TILLMAN, *Primary Examiner.*

SAMUEL H. BLECH, *Examiner.*

M. FOELAK, *Assistant Examiner.*